(No Model.)

J. P. RAND.
WEED KILLING MACHINE.

No. 311,525. Patented Feb. 3, 1885.

Witnesses
Joseph R. Crabill
Chas. P. Cerum

Inventor
Joshua P. Rand

UNITED STATES PATENT OFFICE.

JOSHUA P. RAND, OF DALLAS CITY, ILLINOIS.

WEED-KILLING MACHINE.

SPECIFICATION forming part of Letters Patent No. 311,525, dated February 3, 1885.

Application filed April 16, 1884. (No model.)

*To all whom it may concern:*

Be it known that I, JOSHUA P. RAND, a citizen of the United States, residing at Dallas City, county of Hancock, State of Illinois, have invented a new and useful Weed-Killer for Use on Road-Beds of Railways. I attain this object by mechanism illustrated and described in the following specification.

My invention consists of rawhide or leather drags or brushes, both simple and revolving, attached to a car or some part of a railway-train, which kills grass and weeds by attrition and whipping.

Figure 1:
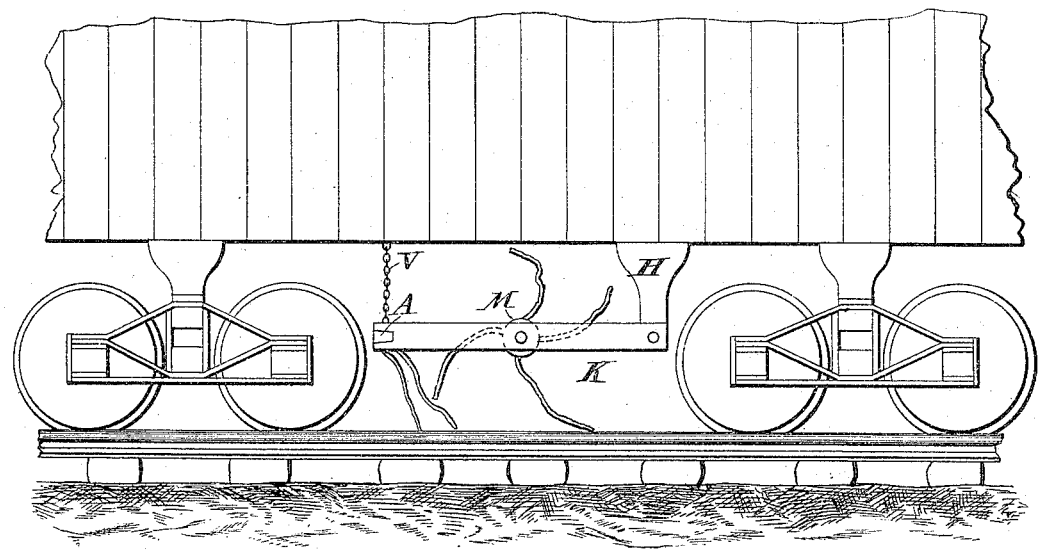
Figure 2:
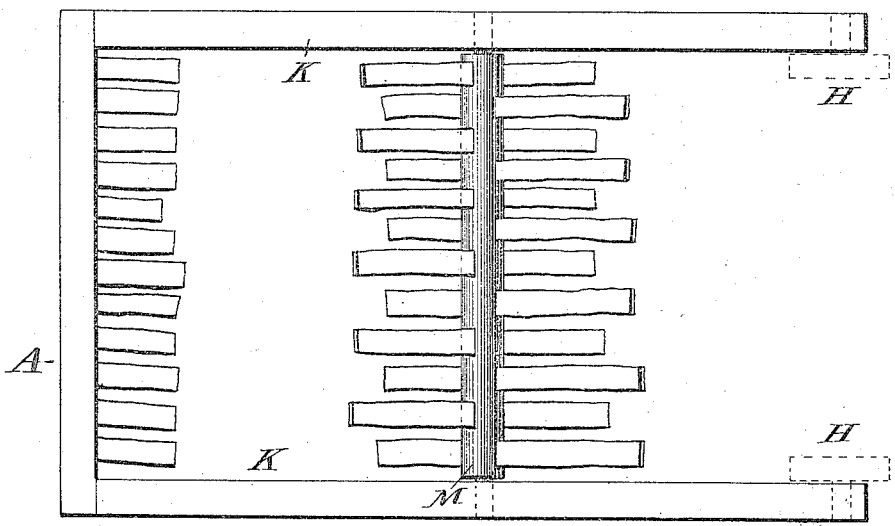

In the accompanying drawings, which are a part of this specification, Figure 1 is a side view of a car with my improvement attached. Fig. 2 is a top view of drags and their fastenings.

Similar letters refer to similar parts throughout the several views.

K K is a frame-work jointed to hangers H at one end, and supported at the other by chains V. The brush-head A is made rigid to the frame K, and has strips of rawhide, leather, or other flexible material attached which are of sufficient length to trail on the ground. M is a revolving head, journaled at its ends in frame K, and has rawhide strips fastened to its entire length and on all sides, and is driven or revolved by power derived from the axle of wheel carrying the car, having weed-killer attached. The drag-heads A and M are long enough to reach on either side of the rails to kill and destroy any growing vegetation that may be near enough to get on the rails, which from its sappy and slippery nature causes the drive-wheels of the locomotive to slip, rendering it necessary to keep the road-bed free from such growing vegetation. The frame K is hinged to hangers H at one end, to permit the drag-brushes to be raised up and fastened out of use at any time it is so desired.

In carrying out my invention I prefer to make the rawhide strips composing brushes A and M about two inches wide and thicker at their base or point of connection to head by doubling and riveting together, to give them more durability and power.

I do not wish it to be understood that my invention is to be used as a snow-plow or sweeper to remove anything whatever from the road-bed. It is simply for the purpose of killing vegetation growing on the road-bed of railways, and I have no desire to dedicate it to any other purpose.

Having thus described my invention, what I claim as new, and desire to secure by Letters Patent, is—

Trailing brushes or drags made of rawhide or leather, for the purpose of killing growing vegetation on the road-bed of railways.

JOSHUA P. RAND.

Witnesses:
 ROBT. SUTTON,
 JOSEPH R. CRABILL.